United States Patent
Muthu et al.

(10) Patent No.: US 10,230,955 B2
(45) Date of Patent: Mar. 12, 2019

(54) METHOD AND SYSTEM TO DETECT AND UTILIZE ATTRIBUTES OF FRAMES IN VIDEO SEQUENCES

(71) Applicant: RIVERSILICA TECHNOLOGIES PVT LTD, Bangalore (IN)

(72) Inventors: Essaki P Muthu, Bangalore (IN); Jagadish K Kamath, Bangalore (IN); Jayashree Budihal, Bangalore (IN)

(73) Assignee: RIVERSILICA TECHNOLOGIES PVT LTD, Bangalore (IN)

( * ) Notice: Subject to any disclaimer, the term of this patent is extended or adjusted under 35 U.S.C. 154(b) by 153 days.

(21) Appl. No.: 15/105,558

(22) PCT Filed: Dec. 16, 2014

(86) PCT No.: PCT/IB2014/066939
§ 371 (c)(1),
(2) Date: Jun. 16, 2016

(87) PCT Pub. No.: WO2015/092665
PCT Pub. Date: Jun. 25, 2015

(65) Prior Publication Data
US 2016/0309157 A1 Oct. 20, 2016

(30) Foreign Application Priority Data
Dec. 16, 2013 (IN) .............. 5842/CHE/2013

(51) Int. Cl.
| | | |
|---|---|---|
| *H04N 19/115* | (2014.01) | |
| *H04N 19/142* | (2014.01) | |
| *H04N 19/172* | (2014.01) | |
| *H04N 19/176* | (2014.01) | |
| *H04N 19/179* | (2014.01) | |
| *H04N 19/182* | (2014.01) | |

(52) U.S. Cl.
CPC ......... *H04N 19/142* (2014.11); *H04N 19/115* (2014.11); *H04N 19/172* (2014.11); *H04N 19/176* (2014.11); *H04N 19/179* (2014.11); *H04N 19/182* (2014.11)

(58) Field of Classification Search
CPC .. H04N 19/142; H04N 19/179; H04N 19/176; H04N 19/182
USPC ........................................ 375/240.02, 240.26
See application file for complete search history.

(56) References Cited

U.S. PATENT DOCUMENTS

| | | |
|---|---|---|
| 2005/0025361 A1 | 2/2005 | Gadre et al. |
| 2009/0109341 A1 | 4/2009 | Oguz et al. |
| 2010/0253835 A1 | 10/2010 | Zhou et al. |
| 2010/0321584 A1 | 12/2010 | Zhu et al. |
| 2012/0281757 A1 | 11/2012 | Roncero Izquierdo et al. |

*Primary Examiner* — On S Mung
(74) *Attorney, Agent, or Firm* — Maschoff Brennan (57) ABSTRACT

The present disclosure relates to a method and a system for determining one or more attributes of each frame of a plurality of frames of a video. The method includes evaluating a first set of pre-defined values for the each frame of the plurality of frames, determining a second set of pre-defined values for the each frame of the plurality of frames based on a second pre-determined criterion, computing a third pre-defined value for the each frame based on a third pre-determined criterion, and identifying the one or more attributes of the each frame. The identified one or more attributes is utilized for stabilizing a rate control model of an encoder. The evaluating is based on a first pre-determined criterion.

10 Claims, 9 Drawing Sheets

METHOD AND SYSTEM TO DETECT AND UTILIZE ATTRIBUTES OF FRAMES IN VIDEO SEQUENCES

TECHNICAL FIELD

The present invention relates to the field of video segmentation, and in particular, relates to methods and systems that detect and utilize attributes of frames in video sequences.

BACKGROUND

In this Internet era, the amount of digital video data that consumers have access to are increasing by leaps and bounds. This video data can be in the form of commercial DVDs and VCDs, personal camcorder recordings, off-air recordings onto HDD and DVR systems, video downloads on a personal computer or mobile phone or PDA or portable player, and the like. To manage these video libraries, new automatic video management technologies are being developed that allow users efficient access to their video content and functionalities such as video categorization, summarization, searching and the like.

The realization of such functionalities relies on analysis and understanding of individual videos. First step of the analysis includes segmentation of the video into its constituent shots. A shot can be defined as a sequence of video frames obtained by one camera without being interrupted. The video is generally configured of a connection of many shots and various video editing effects are used according to methods of connecting the shots. For example, an hour of a TV program typically contains 1000 shots. The video editing effects include an abrupt shot transition and a gradual shot transition. The abrupt shot transition (generally referred to as hard cut) is a technique that the current picture is abruptly changed into another picture. The gradual shot transition is a technique that a picture is gradually changed into another picture such as fade, dissolve, wipe and other special effects.

A common example of the gradual shot transition is the fade, whereby intensity of a shot gradually drops, ending at a black monochromatic frame (fade-out), or the intensity of a black monochromatic frame gradually increases until actual shot becomes visible at its normal intensity (fade-in). Fades to and from black are more common, but fades involving monochromatic frames of other colors are also used. Another example of the gradual shot transition is the dissolve, which can be envisaged as a combined fade-out and fade-in. The dissolve involves two shots, overlapping for a number of frames, during which time the first shot gradually dims and the second shot becomes gradually more distinct.

Presently, various methods and systems are used for identifying and utilizing the different frame characteristics of a video sequence such as Scene Change, the Fading in, the Fading out and the Dissolve. Some of the present methods and systems use comparisons of segmentation mask maps between two successive video frames. In addition, object tracking technique is employed as a complement to handle situations of scene rotation without any extra overhead. Some methods and systems use a two-phase reject-to-refine strategy. According to this strategy, the frames are tested against mean absolute frame differences (MAFD) with a relaxed threshold. Then, these frames are further examined by combined metrics of signed difference of mean absolute frame difference (SDMAFD), absolute difference of frame variance (ADFV), and MAFD after normalization. This approach can be referred to as a histogram equalization process. Some other methods and systems combine the intensity and motion information to detect the scene changes. Most of these approaches have higher overhead. Further, these methods and systems are complex and not very effective in detecting the scene changes.

In light of the above discussion, there is a need for a method and system which overcomes all the above stated disadvantages.

SUMMARY

In an aspect of the present disclosure, a method for determining one or more attributes of each frame of a plurality of frames of a video is provided. The method includes evaluating a first set of pre-defined values for the each frame of the plurality of frames, determining a second set of pre-defined values for the each frame of the plurality of frames based on a second pre-determined criterion, computing a third pre-defined value for the each frame based on a third pre-determined criterion, and identifying the one or more attributes of the each frame. The identified one or more attributes is utilized for stabilizing a rate control model of an encoder. The evaluating is based on a first pre-determined criterion. The first pre-determined criterion includes categorizing one or more pixel values of each macroblock of the each frame based on one or more components of the each frame and calculating the first set of pre-defined values from each of the one or more components of the each frame based on a pre-defined criterion. The second pre-determined criterion includes calculation of the second set of pre-defined values for the each frame for a component of the one or more components. The third pre-determined criterion includes subtracting the first set of predefined values of a previous frame from the first set of pre-defined values of a present frame, and the second set of pre-defined values of a previous frame from the second set of predefined values of a present frame.

In an embodiment of the present disclosure, the method further includes storing the identified one or more attributes of the each frame.

In an embodiment of the present disclosure, the method further includes transmitting data corresponding to the identified one or more attributes to the rate control model of the encoder.

In an embodiment of the present disclosure, the one or more attributes includes scene change, fading-in, fading out, dissolve and the like.

In an embodiment of the present disclosure, the one or more components include one or more luma components and one or more chroma components.

In an embodiment of the present disclosure, the pre-defined criterion includes finding an average value of the one or more pixel values of the each macroblock of the each frame, subtracting the average value from each of the one or more pixel values of the each macroblock and determining sum of the average subtracted values of each of the macroblock. The determined sum of the average subtracted values of each of the macroblock is stored in one or more arrays.

In an embodiment of the present disclosure, the component of the one or more components is one or more luma components.

In another aspect of the present disclosure, a video segmentation system for determining one or more attributes of each frame of a plurality of frames of a video is provided. The system includes an evaluation module to evaluate a first set of pre-defined values for the each frame of the plurality of frames, a determination module to determine a second set of pre-defined values for the each frame of the plurality of frames based on a second pre-determined criterion, a computational module to compute a third pre-defined value for the each frame based on a third pre-determined criterion, and an identification module to identify the one or more attributes of the each frame. The identified one or more attributes is utilized for stabilizing a rate control model of an encoder. The first set of predefined values is evaluated based on a first pre-determined criterion. The second predetermined criterion includes calculation of the second set of pre-defined values for the each frame for a component of the one or more components. The third pre-determined criterion includes subtracting the first set of pre-defined values of a previous frame from the first set of pre-defined values of a present frame, and the second set of pre-defined values of a previous frame from the second set of pre-defined values of a present frame.

In an embodiment of the present disclosure, the evaluation module is further configured to categorize one or more pixel values of each macroblock of the each frame based on one or more components of the each frame.

In another embodiment of the present disclosure, the evaluation module is further configured to calculate the first set of pre-defined values from each of the one or more components of the each frame based on a pre-defined criterion.

In an embodiment of the present disclosure, the video segmentation system further includes a storage module to store the one or more attributes of the each frame.

In an embodiment of the present disclosure, the video segmentation system further includes a transmission module to transmit data corresponding to the identified one or more attributes to the rate control model of the encoder.

In an embodiment of the present disclosure, the one or more attributes includes scene change, fading-in, fading out, dissolve and the like.

In an embodiment of the present disclosure, the one or more components include one or more luma components and one or more chroma components.

In an embodiment of the present disclosure, the pre-defined criterion includes finding an average value of the one or more pixel values of the each macroblock of the each frame, subtracting the average value from each of the one or more pixel values of the each macroblock and determining sum of the average subtracted values of each of the macroblock. The determined sum of the average subtracted values of each of the macroblock is stored in one or more arrays.

In an embodiment of the present disclosure, the component of the one or more components is one or more luma components.

In yet another aspect of the present disclosure, a computer system for determining one or more attributes of each frame of a plurality of frames of a video is provided. The computer system includes one or more processors and a non-transitory memory containing instructions that, when executed by the one or more processors, causes the one or more processors to perform a set of steps. The set of steps includes evaluating a first set of predefined values for the each frame of the plurality of frames, determining a second set of predefined values for the each frame of the plurality of frames based on a second pre-determined criterion, computing a third pre-defined value for the each frame based on a third pre-determined criterion and identifying the one or more attributes of the each frame. The identified one or more attributes is utilized for stabilizing a rate control model of an encoder. The evaluating is based on a first pre-determined criterion.

The first pre-determined criterion includes categorizing one or more pixel values of each macroblock of the each frame based on one or more components of the each frame and calculating the first set of pre-defined values from each of the one or more components of the each frame based on a pre-defined criterion. The second pre-determined criterion includes calculation of the second set of pre-defined values for the each frame for a component of the one or more components. The third pre-determined criterion includes subtracting the first set of pre-defined values of a previous frame from the first set of pre-defined values of a present frame, and the second set of predefined values of a previous frame from the second set of pre-defined values of a present frame.

In an embodiment of the present disclosure, the non-transitory memory containing instructions that, when executed by the one or more processors, cause the one or more processors to perform a further step of transmitting data corresponding to the identified one or more attributes to the rate control model of the encoder.

BRIEF DESCRIPTION OF THE FIGURES

Having thus described the invention in general terms, reference will now be made to the accompanying drawings, which are not necessarily drawn to scale, and wherein:

DETAILED DESCRIPTION

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Figure 1:
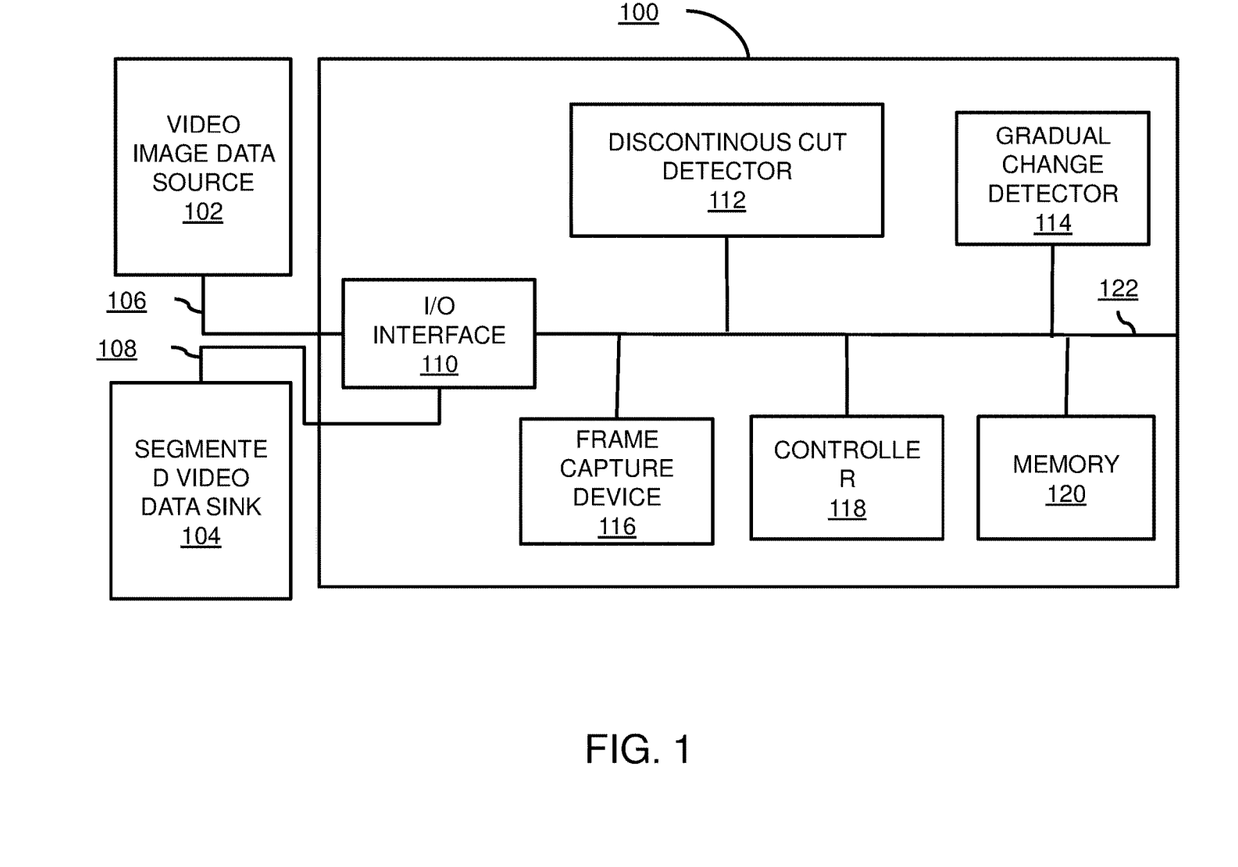
FIG. 1 illustrates a video segmentation system for determining one or more attributes of each frame, in accordance with various embodiments of the present disclosure.

FIG. 1 illustrates a video segmentation system 100 for determining one or more attributes of each frame of a plurality of frames of a video, in accordance with various embodiments of the present disclosure. The video segmentation system 100 identifies and utilizes the one or more attributes of the each frame of the plurality of frames. The one or more attributes are different frame characteristics including scene change, fading in, fading out, dissolve or any other attribute which is essential to stabilize a rate control model in an encoder.

The video segmentation system 100 includes a video image data source 102, a segmented video data sink 104, a first data link 106, a second data link 108, an I/O interface 110, a discontinuous cut detector 112, a gradual change detector 114, a frame capture device 116, a controller 118, a memory 120 and a data bus 122. The video image data source 102 inputs a video signal to the video segmentation system 100. The video image data source 102 provides the video signal to the video segmentation system 100 over the first data link 106. Examples of the video image data source 102 include but may not be limited to a video camera, a video recorder, a camcorder, a video cassette player/recorder, a digital video disk player/recorder, video decoder, or any device suitable for storing and/or transmitting electronic video image data, such as a client or server of a network, a cable television network, or the Internet, and especially the World Wide Web.

In an embodiment of the present disclosure, the video segmentation system 100 receives the video image data via the I/O interface 110. The I/O interface 110 is a device or module that receives and/or transmits the data. The frame capture device 116 captures the each frame of the plurality of frames of the video signal. The discontinuous cut detector 112 detects discontinuous cuts in the each frame of the plurality of frames of the video signal. The gradual change detector 114 detects changes in the each frame of the plurality of frames by identifying the one or more attributes of the video signal (as described in detailed description of FIG. 2 and FIGS. 3A, 3B, 3C, and 3D). The discontinuous cut detector 112 detects the discontinuous cuts and gradual change detector 114 detects the changes at direction of the controller 118. The memory 120 stores the identified one or more attributes of the each frame. In an embodiment of the present disclosure, the discontinuous cut detector 112, gradual change detector 114, the controller 118 and other components work in combination to determine the one or more attributes of the each frame of the plurality of frames of the video signal. In an embodiment of the present disclosure, the data bus 122 connects the I/O interface 110, the discontinuous cut detector 112, the gradual change detector 114, the frame capture device 116, the controller 118 and the memory 120. The data bus 122 is a communication system that transfers data between components inside a device or between two or more devices.

The video segmentation system 100 transmits the segmented video data signal to the segmented video data sink 104 via the second data link 108. The second data link 108 can be a device that is capable of receiving the segmented video signal by the video segmentation system 100 and storing, transmitting or displaying the segmented video image data (segmented video data signal). The segmented video data sink 104 can be a channel device for transmitting the segmented video data for display or storage, or a storage device for indefinitely storing the segmented video data until there arises a need to display or further transmit the segmented video data. In addition, the first data link 106 and the second data link 108 can be any known structure or apparatus for transmitting the video image data to or from the video segmentation system 100 to a physically remote or physically collocated storage or display device. Moreover, the first data link 106 and the second data link 108 can be a hardwired link, a wireless link, a public switched telephone network, a local or wide area network, an intranet, the Internet, a wireless transmission channel, any other distributed network and the like. Similarly, the memory 120 can be any known structural apparatus/module for storing the segmented video data including RAM, a hard drive and disk, a floppy drive and disk, an optical drive and disk, a flash memory and the like. For example, the video segmentation system 100 receives a video V captured by a camera. The video segmentation system 100 detects changes and discontinuous cuts in it and further identifies attributes of every frame of the video, according to which two frames has scene change, five has fade-in, eight are normal frames and rest have fade-out. It may be noted that in FIG. 1, the video segmentation system 100 includes the memory 120; however those skilled in the art would appreciate that the video segmentation system 100 may include more memory modules.

Figure 2:
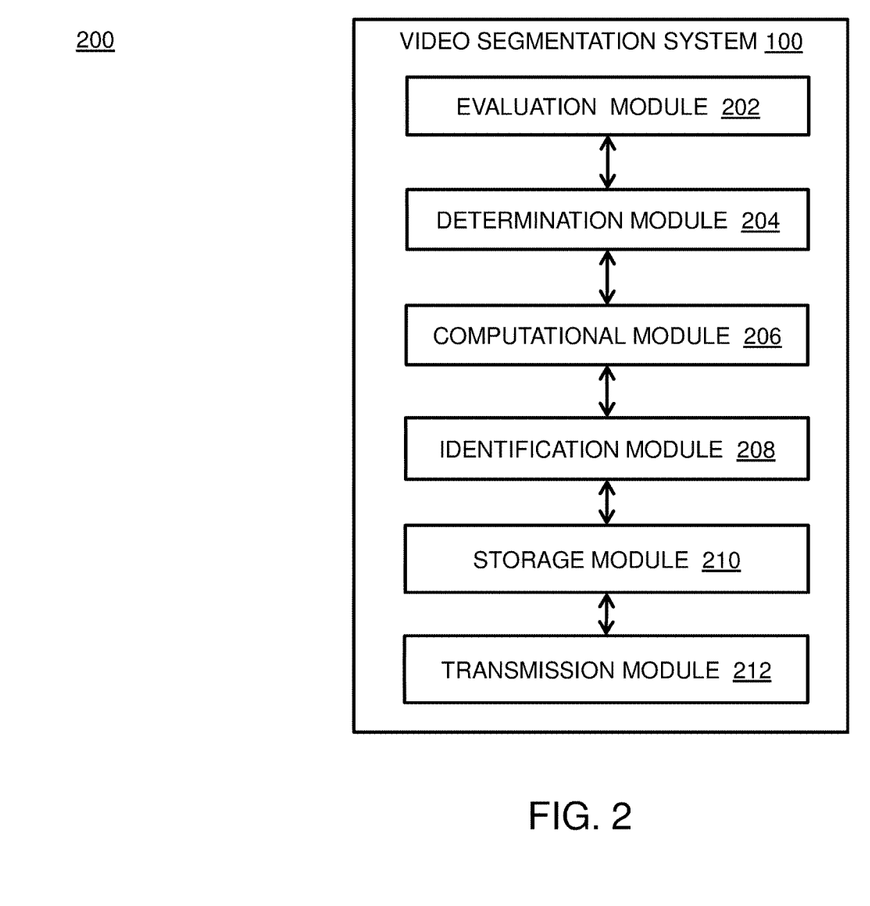
FIG. 2 illustrates a block diagram of the video segmentation system, in accordance with various embodiments of the present disclosure.
Figure 3A:
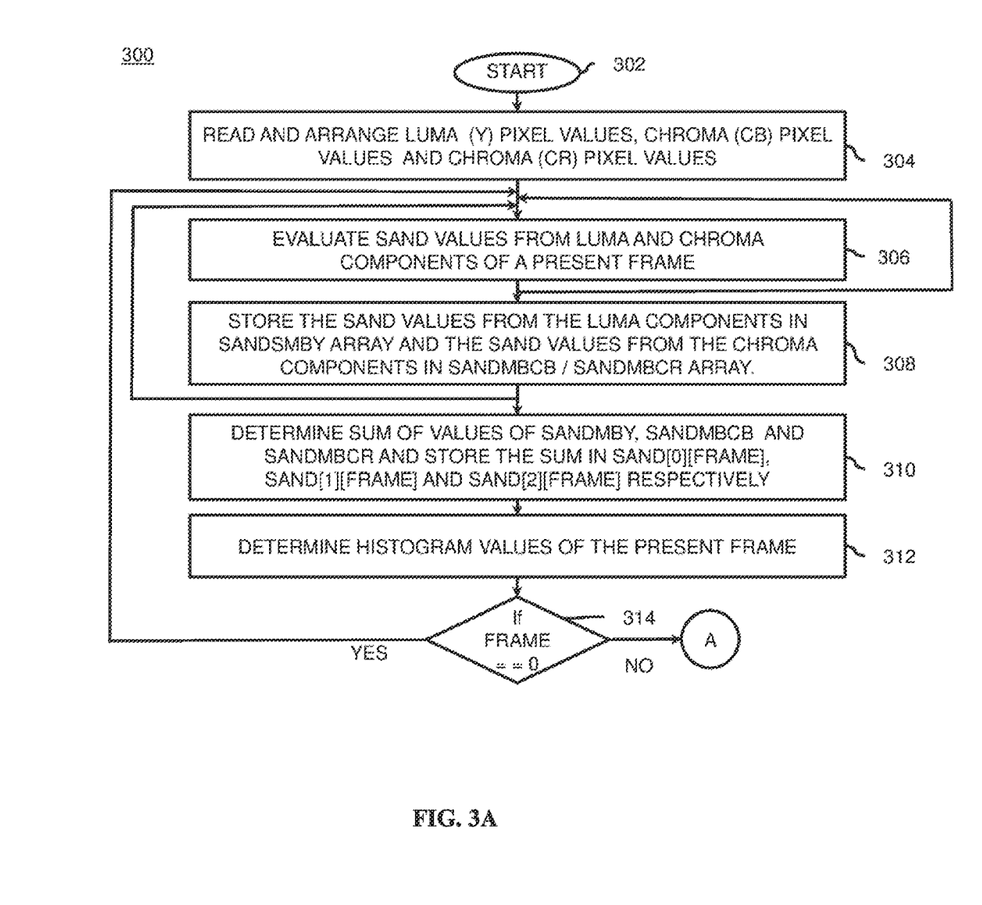
FIGS. 3A, 3B, 3C, and 3D illustrate a flowchart showing calculations for determining the one or more attributes, in accordance with various embodiments of the present disclosure.
Figure 3B:
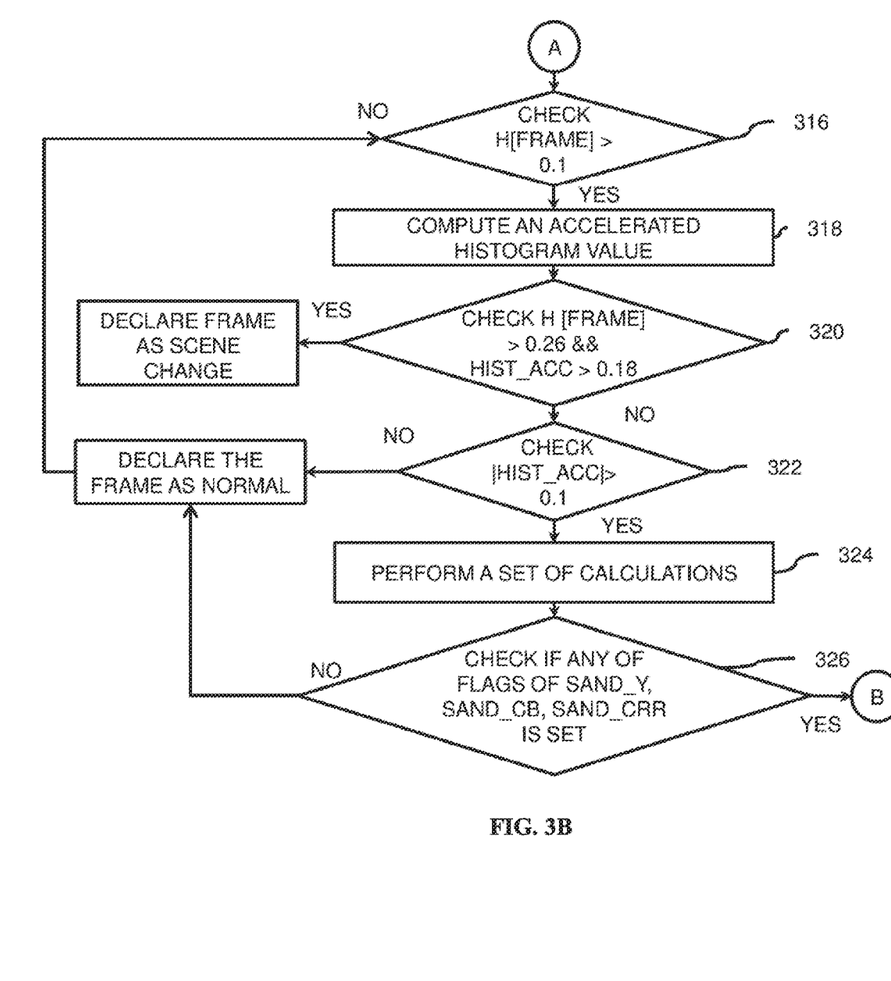
Figure 3C:
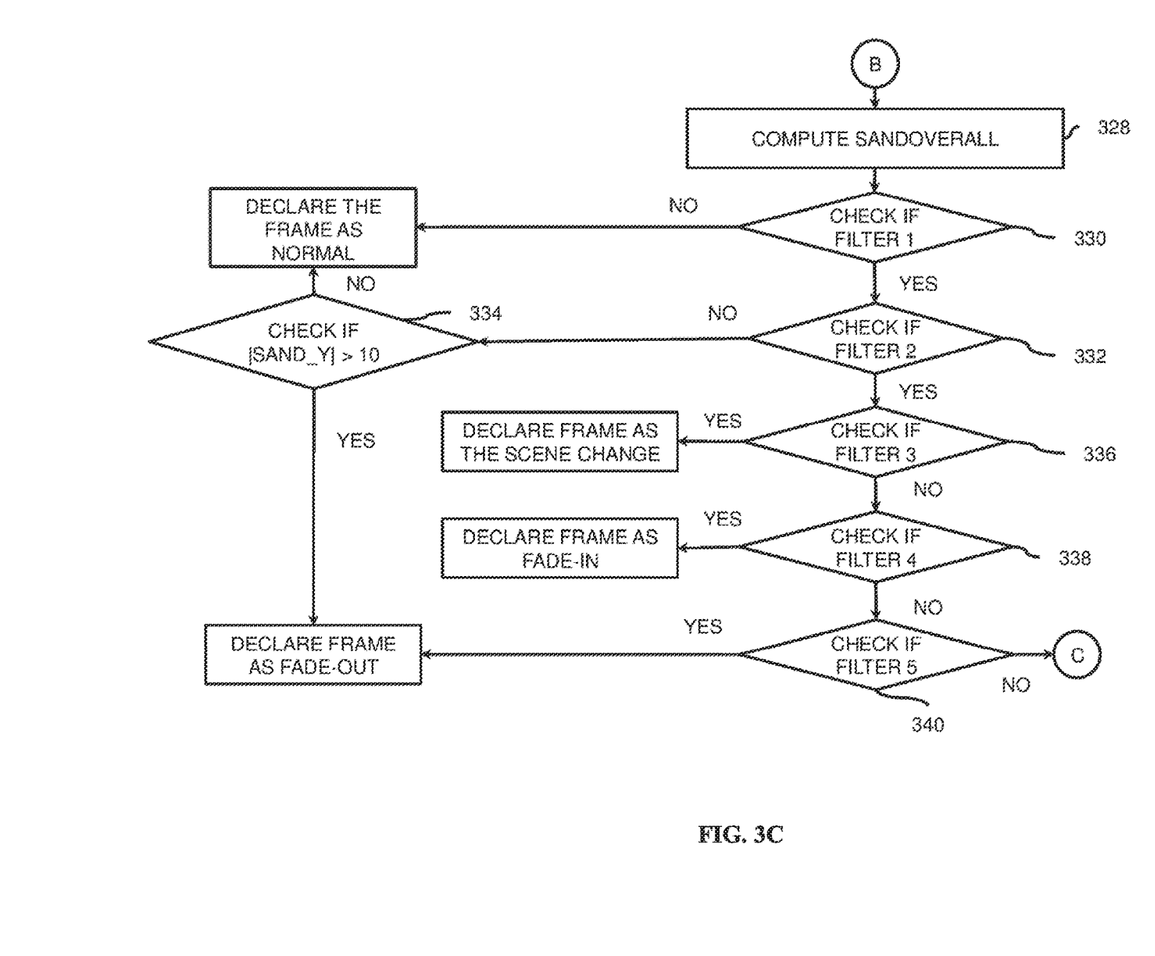
Figure 3D:
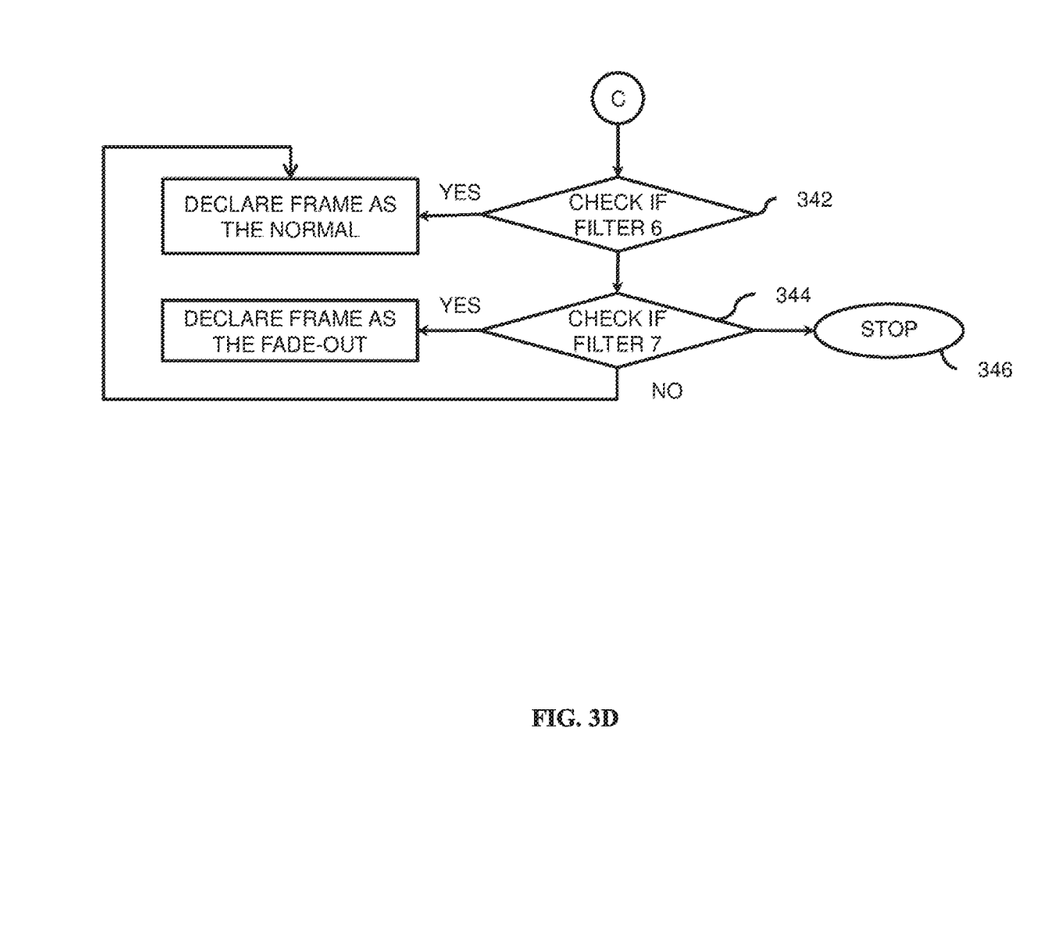

FIG. 2 illustrates a block diagram 200 of the video segmentation system 100, in accordance with various embodiments of the present disclosure. It may be noted that to explain the system elements of FIG. 2, references will be made to the system elements of FIG. 1. The video segmentation system 100 includes an evaluation module 202, a determination module 204, a computational module 206, an identification module 208, a storage module 210 and a transmission module 212. The evaluation module 202 evaluates a first set of pre-defined values for the each frame of the plurality of frames. The first set of pre-defined values is evaluated based on a first pre-determined criterion. The first predetermined criterion includes categorization of one or more pixel values of each macroblock of the each frame based on one or more components of the each frame and calculation of the first set of pre-defined values from each of the one or more components of the each frame based on a pre-defined criterion.

The first set of pre-defined values includes values for SAND based Adaptive New Frame Detection (hereinafter SAND) mechanism. The pre-defined criterion includes finding an average value of the one or more pixel values of the each macroblock of the each frame, subtracting the average value from each of the one or more pixel values of the each macroblock and determining sum of the average subtracted values of each of the macroblock. The first set of pre-defined values is evaluated for each of the one or more components of the each frame. For example, the SAND values are evaluated for Luma (Y), Chroma-Cb (U) and Chroma-Cr (V) frames. The categorization/arrangement of one or more pixel values of the each macroblock of the each frame based the on one or more components are illustrated in detailed description of FIGS. 3A, 3B, 3C, and 3D.

The determination module 204 determines a second set of pre-defined values for the each frame of the plurality of frames based on a second pre-determined criterion. The second pre-determined criterion includes calculation of the second set of pre-defined values for the each frame for a component of the one or more components. The second set of pre-defined values includes histogram values. The histogram values are determined by analyzing the one or more pixel values of the each frame. Moreover, the histogram values are determined for only luma pixels and a corresponding bucket in a 256 bucket array, each representing values from 0 to 255 is incremented. The computational module 206 computes a third pre-defined value for the each frame based on a third pre-determined criterion. The third pre-determined criterion includes subtracting the first set of pre-defined values of a previous frame from the first set of pre-defined values of a present frame and the second set of pre-defined values of a previous frame from the second set of pre-defined values of a present frame. In a simpler term, the computational module 206 computes a difference between the SAND value of the previous frame and the SAND value of the present frame. Further, the computational module 206 computes a difference between the histogram value of the previous frame and the histogram value of the present frame.

The identification module 208 identifies the one or more attributes of the each frame. The identified one or more attributes are utilized for stabilizing the rate control model of the encoder. Moreover, the one or more attributes are identified based on the difference between the SAND value of the present frame and the previous frame and the histogram value of the present frame and the previous frame. The one or more attributes include the scene change, the fading in, the fading out, the dissolve and the like (as illustrated in detailed description of FIG. 1). In the fade-out, intensity of an image decreases and tends to zero over time. The fade-in begins as a blank frame and then, an image begins to appear over time. In the dissolve, while one image disappears, another image simultaneously appears. The calculations for determining/identifying the one or more attributes of the each frame is illustrated in detailed description of FIGS. 3A, 3B, 3C, and 3D. Based on these calculations, type of frame is identified. The storage module 210 stores the one or more attributes.

The transmission module 212 transmits data corresponding to the identified one or more attributes to the rate control model of the encoder. The transmitted data stabilizes the rate control model (described below). In another embodiment of the present disclosure, the transmission module 212 transmits the segmented video to the rate control model. In an embodiment of the present disclosure, the transmission module 212 transmits the data corresponding to the identified one or more attributes to the segmented video data sink 104 and the segmented video data sink 104 transmits the one or more attributes to the rate control model. In another embodiment of the present disclosure, the transmission module 212 transmits the segmented video to the segmented video data sink 104 and the segmented video data sink 104 transmits the segmented video to the rate control model.

In an embodiment of the present disclosure, the discontinuous cut detector 112, the gradual change detector 114 and the controller 118 of the video segmentation system 100 collectively controls the functioning of the evaluation module 202, the determination module 204, the computational module 206 and the identification module 208. In an embodiment of the present disclosure, the memory 120 controls the functioning of the storage module 210.

The rate control model dynamically adjusts itself based on the data and/or segmented video transmitted by the transmission module 212. For example, the frames may have the one or more attributes including scene change, fading in frame, fading out and dissolve in a video sequence. These one or more attributes may change the quality/stability of the rate control model. Thus, the identification of these one or more attributes stabilizes the rate control model. For example, if the present frame is not an intra frame, the present frame as intra frame is announced and QStep for this intra frame by the bitrate model (the rate control model) is found out. However, if the present frame is the intra frame, then, steps of an open GOP structure (bitrate adaptation model) is followed. In another embodiment of the present disclosure, if the present frame is not the intra frame, the QStep founded by the bitrate adaptation model of the present frame is decreased by 25%. If the present frame is the intra frame, the bitrate adaptation model is continued.

In an embodiment of the present disclosure, no scene change is entertained if the scene change comes within five frames of previous scene change. In an embodiment of the present disclosure, once the scene is decided as a changed scene, an I-picture is inserted and a new GOP is started for flexible GOP. Further, QP for this I-picture is fetched through an I-frame model. In addition, for strict GOP, no I-frame is inserted and QP of P-frame is reduced by 25%. In an embodiment of the present disclosure, the rate control model may not be reset in any of these cases (Scene Change or Fading). In an embodiment of the present disclosure, bitrate window is increased up to 2-5 seconds. In an embodiment of the present disclosure, the QP is allocated based on previous I-frame to current I-frame SAND rather than using 75 percent metric. In an embodiment of the present disclosure, previous/upcoming I-frame for QP decision is checked.

It may be noted that in FIG. 2, the video segmentation system 100 includes the evaluation module 202, the determination module 204, the computational module 206, the identification module 208, the storage module 210 and the transmission module 212; however those skilled in the art would appreciate that the video segmentation system 100 may include more modules for determining the one or more attributes of the each frame of the video.

FIGS. 3A, 3B, 3C, and 3D illustrate a flowchart 300 showing calculations for determining the one or more attributes, in accordance with various embodiments of the present disclosure. It may be noted that to explain the process steps of FIGS. 3A, 3B, 3C, and 3D, references will be made to the system elements of FIG. 1 and FIG. 2. It may also be noted that to explain the process steps of the flowchart 300, following assumptions are made. The assumptions are described below:

lumawd: Number of pixels in a Lumarow
lumaht: Number of rows in a Luma frame
chromawd: Number of pixels in a Chromarow
chromaht: Number of rows in a Chroma frame
frame: Present frame
frame−1: Previous frame
orgluma: Luma array of lumawd×lumaht (ensure that the array size is multiples of 16)
orgCb: Chroma (Cb) array of chromawd×chromaht (ensure that the array size is multiples of 8)
orgCr: Chroma (Cr) array of chromawd×chromaht (ensure that the array size is multiples of 8)
N-Histogram array, having 256 cells in a row and total number of frames as rows
h-normalized absolute difference of histograms array, having total number of frames as rows with single cell in a row.

In an embodiment of the present disclosure, following arrays are used to store the SAND values of the luma and the chroma components at the macroblock level. The arrays are illustrated as:

SANDs$MBY$-array of (lumawd/8×lumaht/8)

SAND$MBY$-array of (lumawd/16×lumaht/16)

SAND$MBCb$-array of (chromawd/8×chromaht/8)

SAND$MBCr$-array of (chromawd/8×chromaht/8)

The flowchart 300 initiates at step 302. At step 304, the discontinuous cut detector 112 and the gradual change detector 114 of the video segmentation system 100 reads the one or more pixel values of the present frame. Further, the discontinuous cut detector 112 and the gradual change detector 114 arranges Luma pixels in orgluma, Chroma (Cb) pixel values in orgCb and Chroma (Cr) pixel values in orgCr (illustrated above as assumptions). If the resolution is a non-multiple of 16, the pixel values of frame for last macroblock column/row are repeated through to the last remaining row/column respectively.

At step 306, the evaluation module 202 evaluates the SAND values from the Luma components of the present frame. The steps that are followed for each 8×8 block of the Luma components are as follows: At first step, the evaluation module 202 evaluates an average of 8×8 block from the orgluma. At second step, the evaluation module 202 subtracts the average from each value of the 8×8 block. At third step, the evaluation module 202 evaluates a sum of absolute of the average subtracted values of the 8×8 block.

In addition, the evaluation module 202 evaluates the SAND values from the chroma components of the present frame. The steps that are followed for each 8×8 block of the chroma components (Cb and Cr, separately) are as follows: At first step, the evaluation module 202 evaluates the average of the 8×8 block from orgCb/orgCr. At second step, the evaluation module 202 subtracts the average from each value of the 8×8 block. At third step, the evaluation module 202 evaluates a sum of absolute of the 8×8 block.

At step 308, the storage module 210 stores the SAND values from the luma components in SANDs MBY array and the SAND values from the chroma components in SAND-MBCb/SANDMBCr array. In an embodiment of the present disclosure, the step 304, the step 306 and the step 308 are repeated for remaining three 8×8 blocks of Luma macro block. Accordingly, all the four SAND values are added and stored in SANDMBY array.

At step 310, the evaluation module 202 determines sum of all values in the array SANDMBY and the storage module 210 stores the sum in SAND[0] [frame] for the present frame. In addition, the evaluation module 202 determines sum of all values in the SANDMBCb and the storage module 210 stores the sum in SAND [1] [frame] for the present frame. Moreover, the evaluation module 202 determines sum of all values in the SANDMBCr and the storage module 210 stores the sum in SAND [2] [frame].

At step 312, the determination module 204 determines the histogram values of the present frame. In an embodiment, the number of pixels in the present frame having same values is identified. The pixel values vary from 0 to 255. The numbers of pixels are stored in N array. This process is performed for the Luma values only. Let N [present frame] be the histogram of present frame. It has 256 values. The $0^{th}$ value is number of pixels in the frame which are '0'; the $1^{st}$ value is number pixels in the frame which are '1', and the like.

Further, the computational module 206 computes the difference between the histogram of the present frame and the previous frame. The calculation for computing the difference is found out as follows:

N[present frame]−N[previous frame],present frame>0

In addition, the computational module 206 adds absolute values of these differences. Further, the computational module 206 computes a normalized value by dividing the difference by (lumawd×lumaht).

The storage module 210 stores the normalized value in h array for the present frame, by performing the below calculation:

Σ|N[present frame]−N[previous frame]|

H[present frame]=(luma*wd*×luma*ht*)

At step 314, the computational module 206 checks if the present frame is a first frame. If the present frame is the first frame, then the computational module 206 repeats the steps 306, 308, 310 and 312 for each of the macroblock of the frame. If the present frame is not the first frame, then the computational module 206 employ a list of certain conditions to determine the SAND values after one frame.

At step 316, the computational module 206 checks if the h [frame]>0.1. If the h [frame]>0.1, then at step 318, the computational module 206 computes an accelerated histogram value, histacc by subtracting h of previous frame from h of present frame. The calculation is described below:

$$h[presentframe] = \frac{\Sigma|N[presentframe] - N[previousframe]|}{(luma_{wd} \times luma_{ht})}$$

In an embodiment of the present disclosure, the histogram value (histacc) is determined by subtracting h of previous frame from h of present frame. The calculation is described below:

histacc=*h*[frame]−*h*[frame−1].

However, if the h [frame]<0.1, then the computational module 206 declares the frame as normal. At step 320, the computational module 206 checks if h [frame]> 0.26&|histacc|>0.18. If the condition is satisfied, then the frame is declared as the scene change. However, if the stated condition is not met, then at step 322, the computational module 206 checks if the histacc>0.1. If the condition is not satisfied, then the computational module 206 declares the frame as the normal. However, if the condition is satisfied, then at step 324, a set of calculations is performed in a sequential manner. The set of calculations include computations and are stated below:

Initialize SAND overall = 0

$$SANDY = \left[\frac{SAD[0][\text{frame}] - SAD[0][\text{frame}-1]}{SAD[0][\text{frame}-1]} \times 100\%\right]$$

$$SANDCb = \left[\frac{SAD[1][\text{frame}] - SAD[1][\text{frame}-1]}{SAD[1][\text{frame}-1]} \times 100\%\right]$$

$$SANDCr = \left[\frac{SAD[2][\text{frame}] - SAD[2][\text{frame}-1]}{SAD[2][\text{frame}-1]} \times 100\%\right]$$

$$SANDYflag = \left[\frac{|SAD[0][\text{frame}] - SAD[0][\text{frame}-1]| \times 720 \times 576}{lumawd \times lumaht \times 200}\right]$$

$$SANDCbflag = \left[\frac{|SAD[1][\text{frame}] - SAD[1][\text{frame}-1]| \times 360 \times 288}{chromawd \times chromaht \times 150}\right]$$

$$SANDCrflag = \left[\frac{|SAD[2][\text{frame}] - SAD[2][\text{frame}-1]| \times 360 \times 288}{chromawd \times chromaht \times 150}\right]$$

At step 326, the computational module 206 checks if any flag of the SANDY, SANDCb and SANDCr is set. If any flag of the SANDY, SANDCb and SANDCr are not set, then computational module 206 declares the frame as the normal. However, if any flag of the SANDY, SANDCb and SANDCr is set, then at step 328, the computational module 206 computes SANDoverall. The SANDoverall is computed as:

$$SANDoverall = \left[\frac{SANDY}{10}\right] + \left[\frac{SANDCb}{10}\right] + \left[\frac{SANDCr}{10}\right]$$

In an embodiment of the present disclosure, the computational module 206 employs a list of certain conditions to declare a frame as a 'Scene Change' or 'Fading'. These conditions are hereinafter stated as Filter 1, Filter 2, Filter 3 and so on. The calculations to declare the frame as the 'Scene Change', the 'Fading' and the like are as follows:

If SANDYflag||SANDCbflag||SANDCrflag

Calculate SANDoverall

At step 330, the computational module 206 checks if the filter 1 is satisfied. The calculation of filter 1 is described below:

If SANDoverall≥1&(histacc>0.1 or $h$[frame]>0.1)

If the filter 1 is not satisfied, then the computational module 206 declares the frame as the normal. However, if the filter 1 is satisfied, then at step 332, the computational module 206 checks if the filter 2 is satisfied. The calculation of filter 2 is described below:

If SANDY>60 or

If (SAND*Y*>90&SAND*Cb*>90&SAND*Cr*>90) or

If (SAND*Y*<0orSAND*Cb*<0orSAND*Cr*<0) or

If (SAND*Cb*>40&SAND*Cr*>40)

If the filter 2 is not satisfied, then at step 334, the computational module 206 checks if SAND_Y>10. If the SAND_Y>10, then the computational module 206 declares the frame as the fade-out. However, if the SAND_Y<10, then the computational module 206 declares the frame as the normal. However, if the filter 2 is satisfied, then at step 336, the computational module 206 checks if the filter 3 is satisfied. The calculation of filter 3 is described below:

If histacc>0.8 or

If (SAND*Y*>60) or

If (SAND*Y*>90andSAND*Cb*>90andSAND*Cr*>90) or

If ($h$[frame]>0.25andSAND*Y*<0)

If ($h$[frame]>0.25andSAND*Cb*<0) or

If ($h$[frame]>0.25andSAND*Cr*<0) or

If (ABS(histacc)>0.7) or

If ($h$[frame]>0.7&|SAND*Cb*|>40&|SAND*Cr*|>40)

If the filter 3 is satisfied, then the computational module 206 declares the frame as the scene change. However, if the filter 3 is not satisfied, then at step 338, the computational module 206 checks if the filter 4 is satisfied. The calculation of filter 4 is described below:

If (SAND*Y*>40&(SAND*Cb*>60orSAND*Cr*>60)) or

If (SAND*Y*>60) or

If (SAND*Cb*>97&SAND*Cr*>97) or

If (SAND*Cb*>200) or

If (SAND*Cr*>200)

If the filter 4 is satisfied, then the computational module 206 declares the frame as the fade-in. However, if the filter 4 is not satisfied, then at step 340, the computational module 206 checks if the filter 5 is satisfied. The calculation of filter 5 is described below:

If SAND*Y*≥-10&SAND*Cb*≤-10&SAND*Cr*≤-10,

If the filter 5 is satisfied, then the computational module 206 declares the frame as the fade-out. However, if the filter 5 is not satisfied, then at step 342, the computational module 206 checks if the filter 6 is satisfied. The calculation of filter 6 is described below:

If histacc>0.16

If the filter 6 is satisfied, then the computational module 206 declares the frame as the normal. However, if the filter 6 is not satisfied, then at step 344, the computational module 206 checks if the filter 7 is satisfied. The calculation of filter 7 is described below: if ABS(SANDY>10)

If the filter 7 is satisfied, then the computational module 206 declares the frame as the fade-out. However, if the filter 7 is not satisfied, the computational module 206 declares the frame as the normal. The flowchart 300 terminates at step 346.

In an embodiment of the present disclosure, the histogram and histogram gradients of the present frame are stored back as previous frame's values and serve as a feedback loop. In simpler term, the present frame's data are treated as previous frame's data when next frame comes.

$N$[previousframe]←$N$[presentframe]

$h$[previousframe]←$h$[presentframe]

In an embodiment of the present disclosure, the video segmentation system 100 performs perceptual video quality control by Adaptive QP control over macroblock approach. In this approach, the highest SANDY (SANDmax) among all Macro block in Luma frame is found out from the SANDMBY array in SAND module. If the SANDmax<1000, then complete MB QS array is updated with the current SLICEQS value. If this condition is not met, the following steps are followed. Firstly, the average SANDavg=(SANDmax/number of *MBs*)

is determined. Then, MBQS [index] is calculated according to the below given formula. The index represents each Macroblock.

$$MBQS[\text{index}] = \frac{(4 \times SAND[\text{index}] + 2 \times SANDavg) \times \text{currentslice\_qs}}{2 \times SAND[\text{index}] + 3 \times SANDavg + 1}$$

Furthermore, the MBQS [index] is clipped to a minimum of 1.25 or a maximum of 63.4375. The above stated steps are repeated for all macroblocks. Once the stated steps are performed, the each macroblock has its own QStep value and the each macroblock is separately quantized using this parameter. This helps in using the bits efficiently in the bitrate control model of the encoder.

It may be noted that the flowchart 300 is explained to have above stated process steps; however, those skilled in the art would appreciate that the flowchart 300 may have more/less number of process steps which may enable all the above stated embodiments of the present disclosure.

Figure 4:
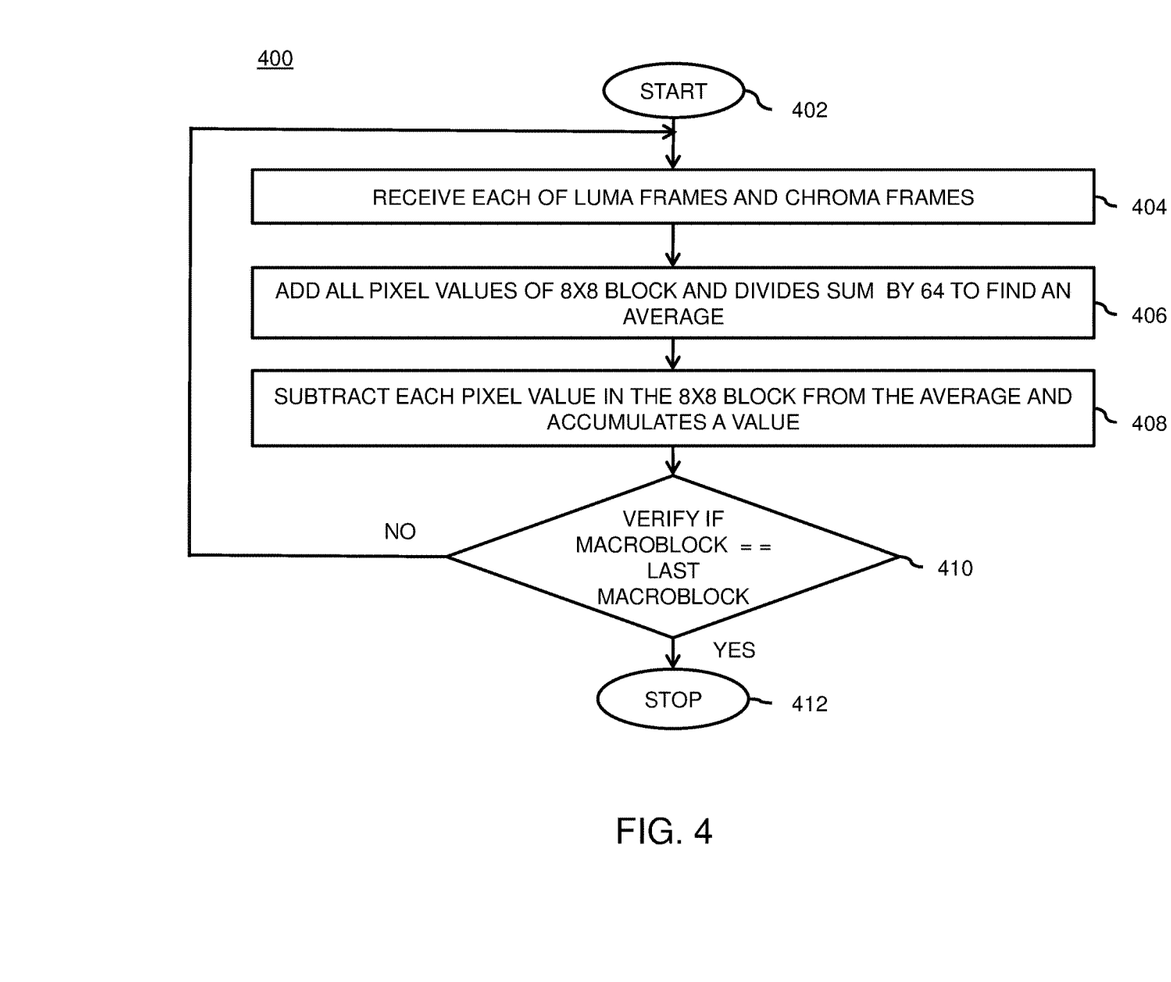
FIG. 4 illustrates a flowchart for calculating SAND value of an 8×8 block, in accordance with various embodiments of the present disclosure.

FIG. 4 illustrates a flowchart 400 for calculating the SAND value of the 8×8 block, in accordance with various embodiments of the present disclosure. It may be noted that to explain various process steps of FIG. 4, references will be made to the system elements of FIG. 1, FIG. 2 and the process steps of FIGS. 3A, 3B, 3C, and 3D. The flow chart 400 initiates at step 402. Following step 402, at step 404, the evaluation module 202 receives each of the luma frames and the chroma frames (both, Cb and Cr). At step 406, the evaluation module 202 adds all the pixel values of the 8×8 block and divides the sum by 64 to find an average. At step 408, the evaluation module 202 subtracts each pixel value in the 8×8 block from the average and accumulates the value. This accumulated value is referred to as SAND value of the 8×8 block. Further, at step 410, the evaluation module 202 verifies that the particular 8×8 block is the last macroblock. If the particular macroblock is not the last macroblock, then the steps 404-408 are followed for the next macroblock. If the particular macroblock is the last macroblock, the flow chart 400 terminates at step 412.

It may be noted that the flowchart 400 is explained to have above stated process steps; however, those skilled in the art would appreciate that the flowchart 400 may have more/less number of process steps which may enable all the above stated embodiments of the present disclosure.

Figure 5:
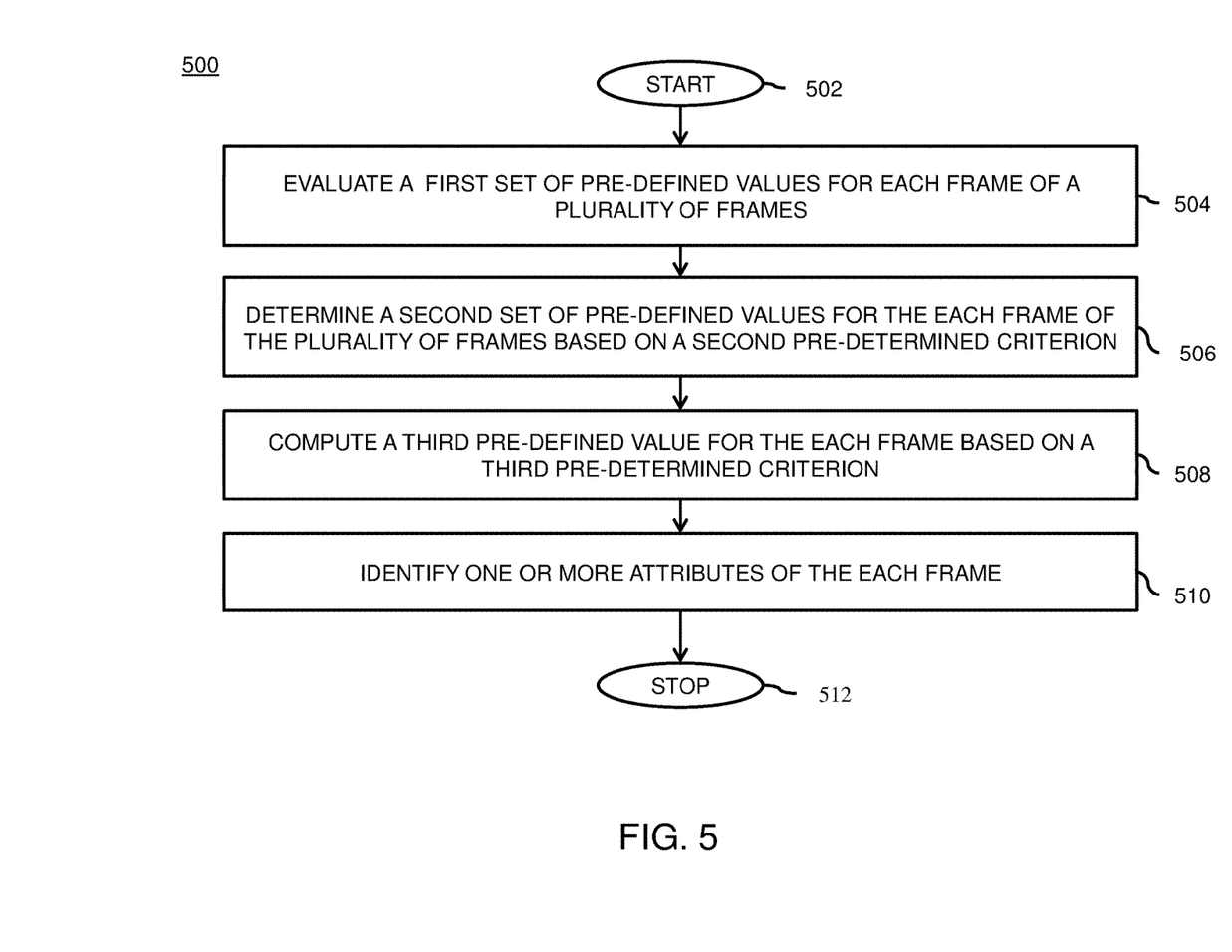
FIG. 5 is a flowchart for determining the one or more attributes of the each frame, in accordance with various embodiments of the present disclosure.

FIG. 5 is a flowchart 500 for determining the one or more attributes of the each frame, in accordance with various embodiments of the present disclosure. It may be noted that to explain various process steps of FIG. 5, references will be made to the system elements of FIG. 1, FIG. 2 and the process steps of FIGS. 3A, 3B, 3C, and 3D and FIG. 4. The flowchart 500 initiates at step 502. Following step 502, at step 504, the evaluation module 202 evaluates the first set of pre-defined values for the each frame of the plurality of frames. At step 506, the determination module 204 determines the second set of pre-defined values for the each frame of the plurality of frames based on the second pre-determined criterion. At step 508, the computational module 206 computes the third pre-defined value for the each frame based on the third pre-determined criterion. At step 510, the identification module 208 identifies the one or more attributes of the each frame. The flowchart 500 terminates at step 512.

It may be noted that the flowchart 500 is explained to have above stated process steps; however, those skilled in the art would appreciate that the flowchart 500 may have more/less number of process steps which may enable all the above stated embodiments of the present disclosure.

Figure 6:
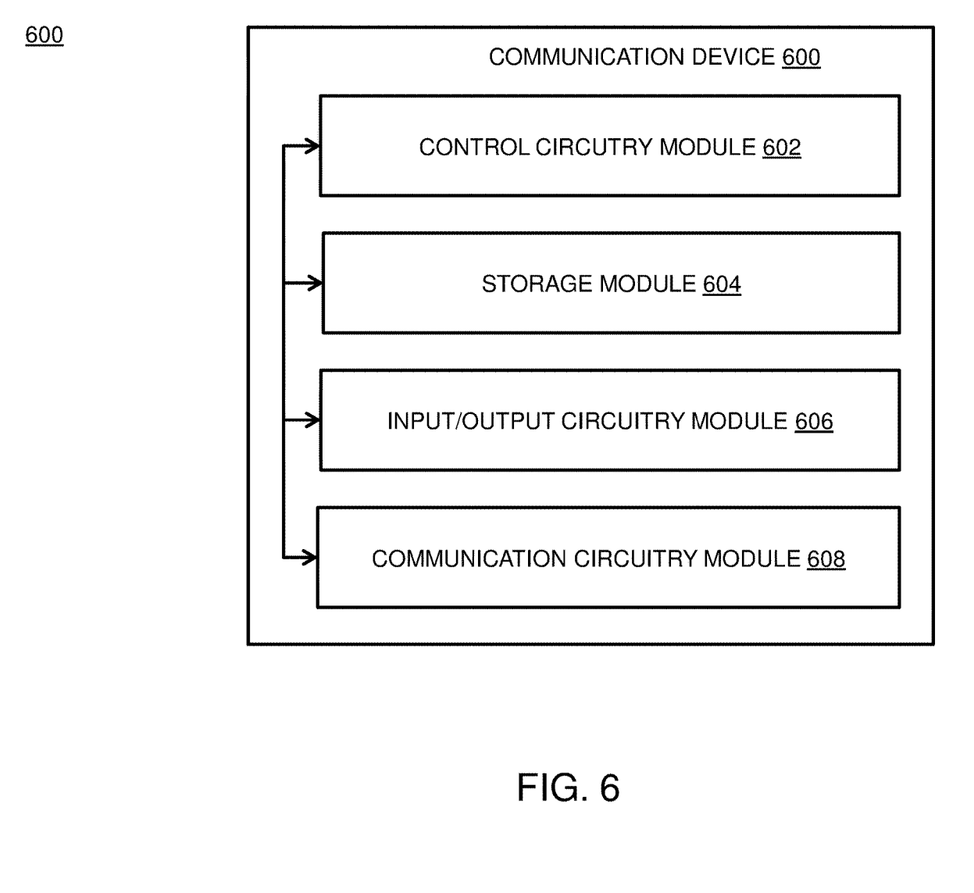
FIG. 6 illustrates a block diagram of a communication device, in accordance with various embodiments of the present disclosure.

FIG. 6 illustrates a block diagram of a communication device 600, in accordance with various embodiments of the present disclosure. The communication device 600 includes a control circuitry module 602, a storage module 604, an input/output circuitry module 606, and a communication circuitry module 608. The communication device 600 includes any suitable type of portable electronic device. Examples of the communication device 600 include but may not be limited to a personal e-mail device (e.g., a Blackberry™ made available by Research in Motion of Waterloo, Ontario), a personal data assistant ("PDA"), a cellular telephone, a Smartphone, a handheld gaming device, a digital camera, a laptop computer, and a tablet computer. In another embodiment of the present disclosure, the communication device 600 can be a desktop computer.

From the perspective of this disclosure, the control circuitry module 602 includes any processing circuitry or processor operative to control the operations and performance of the communication device 600. For example, the control circuitry module 602 may be used to run operating system applications, firmware applications, media playback applications, media editing applications, or any other application. In an embodiment, the control circuitry module 602 drives a display and process inputs received from a user interface.

From the perspective of this disclosure, the storage module 604 includes one or more storage mediums including a hard-drive, solid state drive, flash memory, permanent memory such as ROM, any other suitable type of storage component, or any combination thereof. The storage module 604 may store, for example, media data (e.g., music and video files), application data (e.g., for implementing functions on the communication device 600).

From the perspective of this disclosure, the I/O circuitry module 606 may be operative to convert (and encode/decode, if necessary) analog signals and other signals into digital data. In an embodiment, the I/O circuitry module 606 may also convert the digital data into any other type of signal and vice-versa. For example, the I/O circuitry module 606 may receive and convert physical contact inputs (e.g., from a multi-touch screen), physical movements (e.g., from a mouse or sensor), analog audio signals (e.g., from a microphone), or any other input. The digital data may be provided to and received from the control circuitry module 602, the storage module 604, or any other component of the communication device 600.

It may be noted that the I/O circuitry module 606 is illustrated in FIG. 6 as a single component of the communication device 600; however those skilled in the art would appreciate that several instances of the I/O circuitry module 606 may be included in the communication device 600.

The communication device 600 may include any suitable interface or component for allowing a user to provide inputs to the I/O circuitry module 606. The communication device 600 may include any suitable input mechanism. Examples of the input mechanism include but may not be limited to a button, keypad, dial, a click wheel, and a touch screen. In an embodiment, the communication device 600 may include a capacitive sensing mechanism, or a multi-touch capacitive sensing mechanism.

In an embodiment, the communication device 600 may include specialized output circuitry associated with output devices such as, for example, one or more audio outputs. The audio output may include one or more speakers built into the communication device 600, or an audio component that may be remotely coupled to the communication device 600.

The one or more speakers can be mono speakers, stereo speakers, or a combination of both. The audio component can be a headset, headphones or ear buds that may be coupled to the communication device 600 with a wire or wirelessly.

In an embodiment, the I/O circuitry module 606 may include display circuitry for providing a display visible to the user. For example, the display circuitry may include a screen (e.g., an LCD screen) that is incorporated in the communication device 600.

The display circuitry may include a movable display or a projecting system for providing a display of content on a surface remote from the communication device 600 (e.g., a video projector). The display circuitry may include display driver circuitry, circuitry for driving display drivers or both. The display circuitry may be operative to display content. The display content can include media playback information, application screens for applications implemented on the electronic device, information regarding ongoing communications operations, information regarding incoming communications requests, or device operation screens under the direction of the control circuitry module 602. Alternatively, the display circuitry may be operative to provide instructions to a remote display.

In addition, the communication device 600 includes the communication circuitry module 608. The communication circuitry module 608 may include any suitable communication circuitry operative to connect to a communication network and to transmit communications (e.g., voice or data) from the communication device 600 to other devices within the communications network. The communications circuitry 608 may be operative to interface with the communication network using any suitable communication protocol. Examples of the communication protocol include but may not be limited to Wi-Fi, Bluetooth RTM, radio frequency systems, infrared, LTE, GSM, GSM plus EDGE, CDMA, and quadband.

In an embodiment, the communications circuitry module 608 may be operative to create a communications network using any suitable communications protocol. For example, the communication circuitry module 608 may create a short-range communication network using a short-range communications protocol to connect to other devices. For example, the communication circuitry module 608 may be operative to create a local communication network using the Bluetooth, RTM protocol to couple the communication device 600 with a Bluetooth, RTM headset.

It may be noted that the computing device is shown to have only one communication operation; however, those skilled in the art would appreciate that the communication device 600 may include one more instances of the communication circuitry module 608 for simultaneously performing several communication operations using different communication networks. For example, the communication device 600 may include a first instance of the communication circuitry module 608 for communicating over a cellular network, and a second instance of the communication circuitry module 608 for communicating over Wi-Fi or using Bluetooth RTM.

In an embodiment, the same instance of the communications circuitry module 608 may be operative to provide for communications over several communication networks. In an embodiment, the communication device 600 may be coupled a host device for data transfers, synching the communication device 600, software or firmware updates, providing performance information to a remote source (e.g., providing riding characteristics to a remote server) or performing any other suitable operation that may require the communication device 600 to be coupled to a host device. Several computing devices may be coupled to a single host device using the host device as a server. Alternatively or additionally, the communication device 600 may be coupled to the several host devices (e.g., for each of the plurality of the host devices to serve as a backup for data stored in the communication device 600).

The above stated method and system involves calculation of only two components (the SAND calculation and the histogram calculation) for determining the one or more attributes of the frame, which makes this approach significantly less complex. Moreover, the above stated method and system are more effective in detecting the scene changes. Further, the above stated method and system transmits the one or more attributes of the each frame to the rate control model that dynamically adjusts itself according to the one or more attributes, thereby resulting in enhanced quality of the video.

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. A method for identifying one or more attributes of each frame of a plurality of frames of a video for stabilizing a rate control of an encoder encoding each frame, the method comprising:

capturing, by a processor, a plurality of frames of a video signal, wherein each frame of the plurality of frames comprises a Luma (Y) component, Chroma-Cb (U) component and Chroma-Cr (V) component, wherein each frame comprises macroblocks, each macroblock having dimension of 8×8 pixels;

evaluating, by the processor, pixel values of each macroblock of each frame;

categorizing, by the processor, the pixel values of each macroblock of each frame in each of Luma (Y) component, Chroma-Cb (U) component and Chroma-Cr (V) component;

calculating, by the processor, a histogram for the pixel values in each frame, wherein the histogram is calculated for previous frame and current frame, and wherein the histogram is calculated for the pixel values in each frame in the Luma (Y) component;

calculating, by the processor, a first average of the pixel values of each macroblock of each previous frame and current frame in each of the Luma (Y) component, Chroma-Cb (U) component and Chroma-Cr (V) component;

subtracting, by the processor, the first average of the pixel values of each macroblock of each previous frame and current frame from the pixel values of each macroblock each previous frame and current frame, respectively, in each of Luma (Y) component, Chroma-Cb (U) component and Chroma-Cr (V) component to obtain second pixel values for each macroblock of each previous frame and current frame in each of Luma (Y) component, Chroma-Cb (U) component and Chroma-Cr (V) component;

determining, by the processor, a sum of average for the second pixel values for each macroblock of each previous frame and current frame in each of the Luma (Y) component, Chroma-Cb (U) component and Chroma-Cr (V) component;

and identifying, by the processor, change in one or more attributes in each of the macroblock of each previous frame and current frame, wherein the one or more attributes are identified based on change in the histogram of the pixel values in each previous frame and current frame in the Luma (Y) component, and the sum of average for the second pixel value for each macroblock of each previous frame and current frame in each of the Luma (Y) component, Chroma-Cb (U) component and Chroma-Cr (V) component, and wherein the one or more attributes are utilized for stabilizing a rate control of an encoder encoding each frame for processing the video.

2. The method of claim 1, further comprising transmitting the one or more attributes to the encoder.

3. The method of claim 1, wherein the one or more attributes comprises at least one of scene change, fading-in, fading out and dissolve.

4. The method of claim 1, further comprising storing the sum of average for the second pixel values is in one or more arrays.

5. A video segmentation system for identifying one or more attributes of each frame of a plurality of frames of a video for stabilizing a rate control of an encoder encoding each frame, the video segmentation system comprising:

a processor; and a memory coupled to the processor, wherein the processor is configured to execute program instructions stored in the memory to:

capture a plurality of frames of a video signal, wherein each frame of the plurality of frames comprises a Luma (Y) component, Chroma-Cb (U) component and Chroma-Cr (V) component, wherein each frame comprises macroblocks, each macroblock having dimension of 8×8 pixels;

evaluate pixel values of each macroblock of each frame;

categorize the pixel values of each macroblock of each frame in each of Luma (Y) component, Chroma-Cb (U) component and Chroma-Cr (V) component;

calculate a histogram for the pixel values in each frame, wherein the histogram is calculated for previous frame and current frame, and wherein the histogram is calculated for the pixel values in each frame in the Luma (Y) component;

calculate a first average of the pixel values of each macroblock of each previous frame and current frame in each of the Luma (Y) component, Chroma-Cb (U) component and Chroma-Cr (V) component;

subtract the first average of the pixel values of each macroblock of each previous frame and current frame from the pixel values of each macroblock each previous frame and current frame, respectively, in each of Luma (Y) component, Chroma-Cb (U) component and Chroma-Cr (V) component to obtain second pixel values for each macroblock of each previous frame and current frame in each of Luma (Y) component, Chroma-Cb (U) component and Chroma-Cr (V) component;

determine a sum of average for the second pixel values for each macroblock of each previous frame and current frame in each of the Luma (Y) component, Chroma-Cb (U) component and Chroma-Cr (V) component;

and identify change in one or more attributes in each of the macroblock of each previous frame and current frame, wherein the one or more attributes are identified based on change in the histogram of the pixel values in each previous frame and current frame in the Luma (Y) component, and the sum of average for the second pixel value for each macroblock of each previous frame and current frame in each of the Luma (Y) component, Chroma-Cb (U) component and Chroma-Cr (V) component, and wherein the one or more attributes are utilized for stabilizing a rate control of an encoder encoding each frame for processing the video.

6. The video segmentation system of claim 5, wherein the memory is configured to store the one or more attributes of each frame.

7. The video segmentation system of claim 5, wherein the processor is configured to transmit the one or more attributes to the encoder.

8. The video segmentation system of claim 5, wherein the sum of average for the second pixel values is stored in one or more arrays.

9. A non-transitory computer readable medium embodying a program executable in a computing device for identifying one or more attributes of each frame of a plurality of frames of a video for stabilizing a rate control of an encoder encoding each frame, the program comprising:

a program code for capturing a plurality of frames of a video signal, wherein each frame of the plurality of frames comprises a Luma (Y) component, Chroma-Cb (U) component and Chroma-Cr (V) component, wherein each frame comprises macroblocks, each macroblock having dimension of 8×8 pixels;

a program code for evaluating pixel values of each macroblock of each frame;

a program code for categorizing pixel the values of each macroblock of each frame in each of Luma (Y) component, Chroma-Cb (U) component and Chroma-Cr (V) component;

a program code for a histogram for the pixel values in each frame, wherein the histogram is calculated for previous frame and current frame, and wherein the histogram is calculated for the pixel values in each frame in the Luma (Y) component;

a program code for calculating a first average of the pixel values of each macroblock of each previous frame and current frame in each of the Luma (Y) component, Chroma-Cb (U) component and Chroma-Cr (V) component;

a program code for subtracting the first average of the pixel values of each macroblock of each previous frame and current frame from the pixel values of each macroblock each previous frame and current frame, respectively, in each of Luma (Y) component, Chroma-Cb (U) component and Chroma-Cr (V) component to obtain second pixel values for each macroblock of each previous frame and current frame in each of Luma (Y) component, Chroma-Cb (U) component and Chroma-Cr (V) component;

a program code for determining a sum of average for the second pixel values for each macroblock of each previous frame and current frame in each of the Luma (Y) component, Chroma-Cb (U) component and Chroma-Cr (V) component;

and a program code for identifying change in one or more attributes in each of the macroblock of each previous frame and current frame, wherein the one or more attributes are identified based on change in the histogram of the pixel values in each previous frame and current frame in the Luma (Y) component, and the sum of average for the second pixel value for each macroblock of each previous frame and current frame in each of the Luma (Y) component, Chroma-Cb (U) component and Chroma-Cr (V) component, and wherein the one or more attributes are utilized for stabilizing a rate control of an encoder encoding each frame for processing the video.

10. The program of claim 9, further comprising a program code for transmitting the one or more attributes to the encoder.

* * * * *